(12) United States Patent
McElroy et al.

(10) Patent No.: US 8,101,307 B2
(45) Date of Patent: Jan. 24, 2012

(54) FUEL CELL SYSTEM WITH ELECTROCHEMICAL ANODE EXHAUST RECYCLING

(75) Inventors: James McElroy, Suffield, CT (US); Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1040 days.

(21) Appl. No.: 11/491,488

(22) Filed: Jul. 24, 2006

(65) Prior Publication Data

US 2007/0178338 A1    Aug. 2, 2007

Related U.S. Application Data

(60) Provisional application No. 60/701,977, filed on Jul. 25, 2005.

(51) Int. Cl.
   *H01M 8/06* (2006.01)
(52) U.S. Cl. ........ 429/415; 429/411; 429/414; 429/434; 429/493
(58) Field of Classification Search .............. 429/12–46; 204/266, 296
   See application file for complete search history.

(56) References Cited

U.S. PATENT DOCUMENTS

| | | |
|---|---|---|
| 3,488,266 A | 1/1970 | French |
| 4,041,210 A | 8/1977 | Van Dine |
| 4,182,795 A | 1/1980 | Baker et al. |
| 4,532,192 A | 7/1985 | Baker et al. |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,084,362 A | 1/1992 | Farooque |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,527,631 A | 6/1996 | Singh et al. |
| 5,573,867 A | 11/1996 | Zafred et al. |

(Continued)

FOREIGN PATENT DOCUMENTS

JP    2004-247290    9/2004

(Continued)

OTHER PUBLICATIONS

"Type BPL Granular Carbon", Calgon Product Bulletin, Calgon Corporation, Activated Carbon Division, 2 pgs.

(Continued)

*Primary Examiner* — Keith Walker
(74) *Attorney, Agent, or Firm* — The Marbury Law Group, PLLC

(57) ABSTRACT

A method of operating a fuel cell system includes providing a fuel inlet stream into a fuel cell stack, operating the fuel cell stack to generate electricity and a hydrogen containing fuel exhaust stream, separating at least a portion of hydrogen contained in the fuel exhaust stream using a high temperature, low hydration ion exchange membrane cell stack, and providing the hydrogen separated from the fuel exhaust stream into the fuel inlet stream.

10 Claims, 2 Drawing Sheets

U.S. PATENT DOCUMENTS

| | | | |
|---|---|---|---|
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,955,039 A | 9/1999 | Dowdy | |
| 6,013,385 A | 1/2000 | DuBose | |
| 6,051,125 A | 4/2000 | Pham et al. | |
| 6,106,964 A | 8/2000 | Voss et al. | |
| 6,280,865 B1 | 8/2001 | Eisman et al. | |
| 6,329,090 B1 | 12/2001 | McElroy et al. | |
| 6,403,245 B1 | 6/2002 | Hunt | |
| 6,436,562 B1 | 8/2002 | DuBose | |
| 6,451,466 B1 | 9/2002 | Grasso et al. | |
| 6,531,243 B2 | 3/2003 | Thom | |
| 6,623,880 B1 | 9/2003 | Geisbrecht et al. | |
| 6,821,663 B2 | 11/2004 | McElroy et al. | |
| 6,924,053 B2 | 8/2005 | McElroy | |
| 2001/0049035 A1 | 12/2001 | Haltiner, Jr. et al. | |
| 2001/0049039 A1* | 12/2001 | Haltiner, Jr. | 429/24 |
| 2002/0015867 A1 | 2/2002 | Cargnelli et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2003/0157386 A1* | 8/2003 | Gottmann et al. | 429/26 |
| 2003/0162067 A1 | 8/2003 | McElroy | |
| 2003/0196893 A1 | 10/2003 | McElroy | |
| 2003/0205641 A1 | 11/2003 | McElroy | |
| 2004/0018144 A1 | 1/2004 | Briscoe | |
| 2004/0081859 A1 | 4/2004 | McElroy et al. | |
| 2004/0096713 A1 | 5/2004 | Ballantine et al. | |
| 2004/0142215 A1 | 7/2004 | Barbir et al. | |
| 2004/0191597 A1 | 9/2004 | McElroy | |
| 2004/0191598 A1 | 9/2004 | Gottmann et al. | |
| 2004/0202914 A1 | 10/2004 | Sridhar et al. | |
| 2004/0224193 A1 | 11/2004 | Mitlitsky et al. | |
| 2005/0048334 A1 | 3/2005 | Sridhar et al. | |
| 2005/0164051 A1 | 7/2005 | Venkataraman et al. | |
| 2006/0251934 A1 | 11/2006 | Valensa et al. | |
| 2007/0017367 A1 | 1/2007 | McElroy et al. | |
| 2007/0017368 A1 | 1/2007 | LeVan et al. | |
| 2007/0017369 A1 | 1/2007 | LeVan et al. | |
| 2007/0178338 A1 | 8/2007 | McElroy et al. | |

FOREIGN PATENT DOCUMENTS

| | | |
|---|---|---|
| WO | WO 2004/013258 A1 | 2/2004 |
| WO | WO 2004/093214 | 10/2004 |

OTHER PUBLICATIONS

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1-9-4; 9-12-9-14.

LeVan, M. Douglas et al., "Adsorption and Ion Exchange", Perry's Chemical Engineers' Handbook ($7^{th}$ Edition), 1997, 66 pgs.

Levan, M. Douglas et al., "Fixed-Bed Adsorption of Gases: Effect of Velocity Variations on Transition Types", AIChE Journal, vol. 34, No. 6, Jun. 1988, pp. 996-1005.

Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundamentals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pqs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al., "Adsorption of carbon dioxide at high temperature—a review", Separation and Purification Technology, vol. 26, 2002, pp. 195-205.

* cited by examiner

FUEL CELL SYSTEM WITH ELECTROCHEMICAL ANODE EXHAUST RECYCLING

The present application claims benefit of U.S. Provisional Patent Application Ser. No. 60/701,977, filed Jul. 25, 2005, which is incorporated herein by reference in entirety.

BACKGROUND OF THE INVENTION

The present invention relates generally to the field of gas separation and more particularly to fuel cell systems with electrochemical fuel exhaust fuel recovery.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

The embodiments of the invention provide a fuel cell system with an electrochemical fuel cell stack fuel (i.e., anode) exhaust recycling. The fuel exhaust stream is sent to a hydrogen separation device which separates hydrogen from the fuel exhaust stream. The hydrogen separation device is an electrochemical pump separation unit, such as a proton exchange membrane type separation unit. The separated hydrogen is recycled into the fuel inlet stream.

DETAILED DESCRIPTION OF THE PREFERRED EMBODIMENTS

The first and second embodiments of the invention illustrate how the electrochemical pump separation unit is used together with a fuel cell system, such as a solid oxide fuel cell system. It should be noted that other fuel cell systems may also be used.

In the system of the first embodiment, a fuel humidifier is used to humidify the fuel inlet stream provided into the fuel cell stack. In the system of the second embodiment, the fuel humidifier may be omitted. A portion of the fuel cell stack fuel exhaust stream is directly recycled into the fuel inlet stream to humidify the fuel inlet steam. Another portion of the fuel cell stack fuel exhaust stream is provided into the separation unit, and the separated hydrogen is then provided into the fuel inlet stream.

Figure 1:
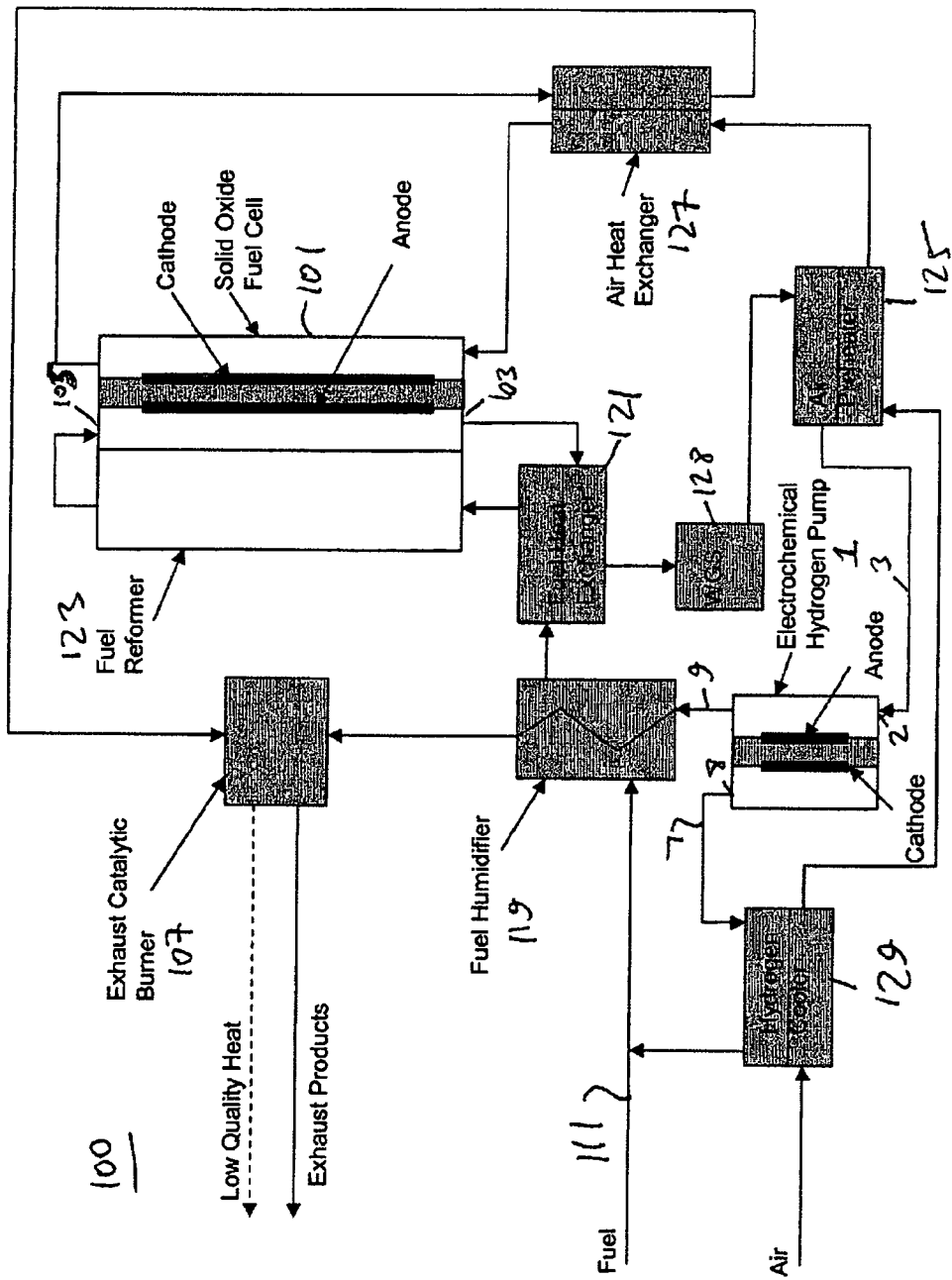
FIGS. 1 and 2 are schematic diagrams of fuel cell systems of the embodiments of the invention.

FIG. 1 illustrates a fuel cell system 100 of the first embodiment. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ), an anode electrode, such as a nickel-YSZ cermet, and a cathode electrode, such as lanthanum strontium manganite).

The system also contains an electrochemical pump separation unit 1 which electrochemically separates hydrogen from the fuel exhaust stream. The electrochemical pump unit 1 may comprise any suitable proton exchange membrane device comprising a polymer electrolyte. The hydrogen diffuses through the polymer electrolyte under an application of a potential difference between anode and cathode electrodes located on either side of the electrolyte. Preferably, the electrochemical pump comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. These cells generally operate in a temperature range of above 100 to about 200 degrees Celsius. Thus, the heat exchangers in the system 100 preferably keep the fuel exhaust stream at a temperature of about 120 to about 200 degrees Celsius, such as about 160 to about 190 degrees Celsius.

The system 100 also contains the first conduit 3 which operatively connects a fuel exhaust outlet 103 of the fuel cell stack 101 to a first inlet 2 of the electrochemical pump separation unit 1. The system also contains a second conduit 7 which operatively connects an outlet 8 of the electrochemical pump separation unit 1 to a fuel inlet 105 of the fuel cell stack 101. Preferably, the system 100 lacks a compressor which in operation compresses the fuel cell stack fuel exhaust stream to be provided into the electrochemical pump separation unit 1. The system 100 also contains a third conduit 9 which removes the exhaust from the unit 1. The conduit 9 may be connected to a catalytic burner 107 or to an atmospheric vent.

The system 100 further contains a fuel humidifier 119 having a first inlet operatively connected to a hydrocarbon fuel source, such as the hydrocarbon fuel inlet conduit 111, a second inlet operatively connected to the fuel cell stack fuel exhaust 103, a first outlet operatively connected to the fuel cell stack fuel inlet 105, and a second outlet operatively connected to a burner 107. In operation, the fuel humidifier 119 humidifies a hydrocarbon fuel inlet stream from conduit 111 containing the recycled hydrogen using water vapor contained in a fuel cell stack fuel exhaust stream. The fuel humidifier may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The humidifier passively transfers water vapor and enthalpy from the fuel exhaust stream into the fuel inlet stream to provide a 2 to 2.5 steam to carbon ratio in the fuel inlet stream. The fuel inlet stream temperature may be raised to about 80 to about 90 degrees Celsius in the humidifier.

The system 100 also contains a recuperative heat exchanger 121 which exchanges heat between the stack fuel exhaust stream and the hydrocarbon fuel inlet stream being provided from the humidifier 119. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, incorporated herein by reference in its entirety. Alternatively, the external reformer 123 may be omitted if the stack 101 contains cells of the internal reforming type where reformation occurs primarily within the fuel cells of the stack.

Optionally, the system 100 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 100 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device. The system also optionally contains a hydrogen cooler heat exchanger 129 which cools the separated hydrogen stream provided from unit 1, using an air stream, such as an air inlet stream.

The system may also contain an optional water-gas shift reactor 128. The water-gas shift reactor 128 may be any suitable device which converts at least a portion of the water in the fuel exhaust stream into free hydrogen. For example, the reactor 128 may comprise a tube or conduit containing a catalyst which converts some or all of the carbon monoxide and water vapor in the fuel exhaust stream into carbon dioxide and hydrogen. Thus, the reactor 128 increases the amount of hydrogen in the fuel exhaust stream. The catalyst may be any suitable catalyst, such as a iron oxide or a chromium promoted iron oxide catalyst. The reactor 128 may be located between the fuel heat exchanger 121 and the air preheater heat exchanger 125.

The system 100 of the first embodiment operates as follows. A fuel inlet stream is provided into the fuel cell stack 101 through fuel inlet conduit 111. The fuel may comprise any suitable fuel, such as a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

The fuel inlet stream passes through the humidifier 119 where humidity is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 123, which is preferably an external reformer. For example, reformer 123 may comprise a reformer described in U.S. patent application Ser. No. 11/002,681, filed on Dec. 2, 2004, incorporated herein by reference in its entirety. The fuel reformer 123 may be any suitable device which is capable of partially or wholly reforming a hydrocarbon fuel to form a carbon containing and free hydrogen containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, the humidifier 119 is located upstream of the heat exchanger 121 which is located upstream of the reformer 123 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. If desired, the air inlet stream may also pass through the hydrogen cooler heat exchanger 129 and/or through the air preheat heat exchanger 125 to further increase the temperature of the air before providing the air into the stack 101.

Once the fuel and air are provided into the fuel cell stack 101, the stack 101 is operated to generate electricity and a hydrogen containing fuel exhaust stream. About 25% of the input fuel exits the fuel exhaust outlet 103 of the stack. The fuel exhaust stream (i.e., the stack anode exhaust stream) is provided from the stack fuel exhaust outlet 103 into the electrochemical pump separation unit 1. At least a portion of hydrogen contained in the fuel exhaust stream is separated in the unit 1. The hydrogen separated from the fuel exhaust stream in the unit 1 is then provided back into the fuel inlet stream. Preferably, the hydrogen is provided back into the fuel inlet conduit 111 upstream of the humidifier 119.

The fuel exhaust stream is provided into the unit 1 as follows. The fuel exhaust stream may contain hydrogen, water vapor, carbon monoxide, carbon dioxide, some unreacted hydrocarbon gas, such as methane and other reaction by-products and impurities. This exhaust stream is first provided into the heat exchanger 121, where its temperature is lowered, preferably to less than 200 degrees Celsius, while the temperature of the fuel inlet stream is raised. If the water-gas shift reactor 128 and the air preheater heat exchanger 125 are present, then the fuel exhaust stream is provided through the reactor 128 to convert at least a portion of the water vapor and a majority of the residual carbon monoxide into carbon dioxide and hydrogen. The fuel exhaust stream is then passed through the heat exchanger 125 to further lower its temperature while raising the temperature of the air inlet stream. The temperature may be lowered to 90 to 110 degrees Celsius for example.

The fuel exhaust stream is then provided into inlet 2 of the electrochemical pump separation unit 1 via conduit 3. During the separation step in unit 1, at least a majority of the hydrogen, such as about 85% of the hydrogen in the fuel exhaust stream, diffuses through the electrolyte of the cells in the unit 1, while allowing the water vapor, carbon dioxide, carbon monoxide and remaining hydrocarbon gas in the fuel exhaust stream to be passed through conduit 9 to the humidifier 119.

In the fuel humidifier 119, a portion of the water vapor in the fuel exhaust stream is transferred to the fuel inlet stream to humidify the fuel inlet stream. The fuel/hydrogen fuel inlet stream mixture is humidified to 80 C to 90 C dew point. The remainder of the fuel exhaust stream is then provided into the burner 107 along with the air (i.e., cathode) exhaust stream from the stack 101 to be burned and to provide low quality heat. The heat from the burner 107 may be used to heat the reformer 123 or it may be provided to other parts of the system 100 or to a heat consuming devices outside the system 100, such as a building heating system.

The hydrogen separated from the fuel exhaust stream is then removed from unit 1 through outlet 8 and conduit 7 and provided into the hydrocarbon fuel inlet stream in the fuel inlet conduit 111. If desired, prior to being provided to the fuel inlet conduit, the hydrogen stream may be passed through a hydrogen cooler heat exchanger 129, where the hydrogen stream exchanges heat with an air stream, such as the air inlet stream provided into the fuel cell stack 101. The temperature of the hydrogen stream is lowered in the heat exchanger 129 before being provided into the fuel inlet conduit, while the temperature of the air inlet stream is raised. Thus, the hydrocarbon fuel inlet stream is mixed with a low dew point, near ambient temperature recycled hydrogen recovered from the anode tail gas with an electrochemical hydrogen pump 1.

Thus, with respect to the fuel exhaust stream, the heat exchanger 121 is located upstream of the reactor 128, which is located upstream of the heat exchanger 125, which is located upstream of the pump unit 1, which is located upstream of the humidifier 119 and the fuel inlet conduit 111.

Figure 2:
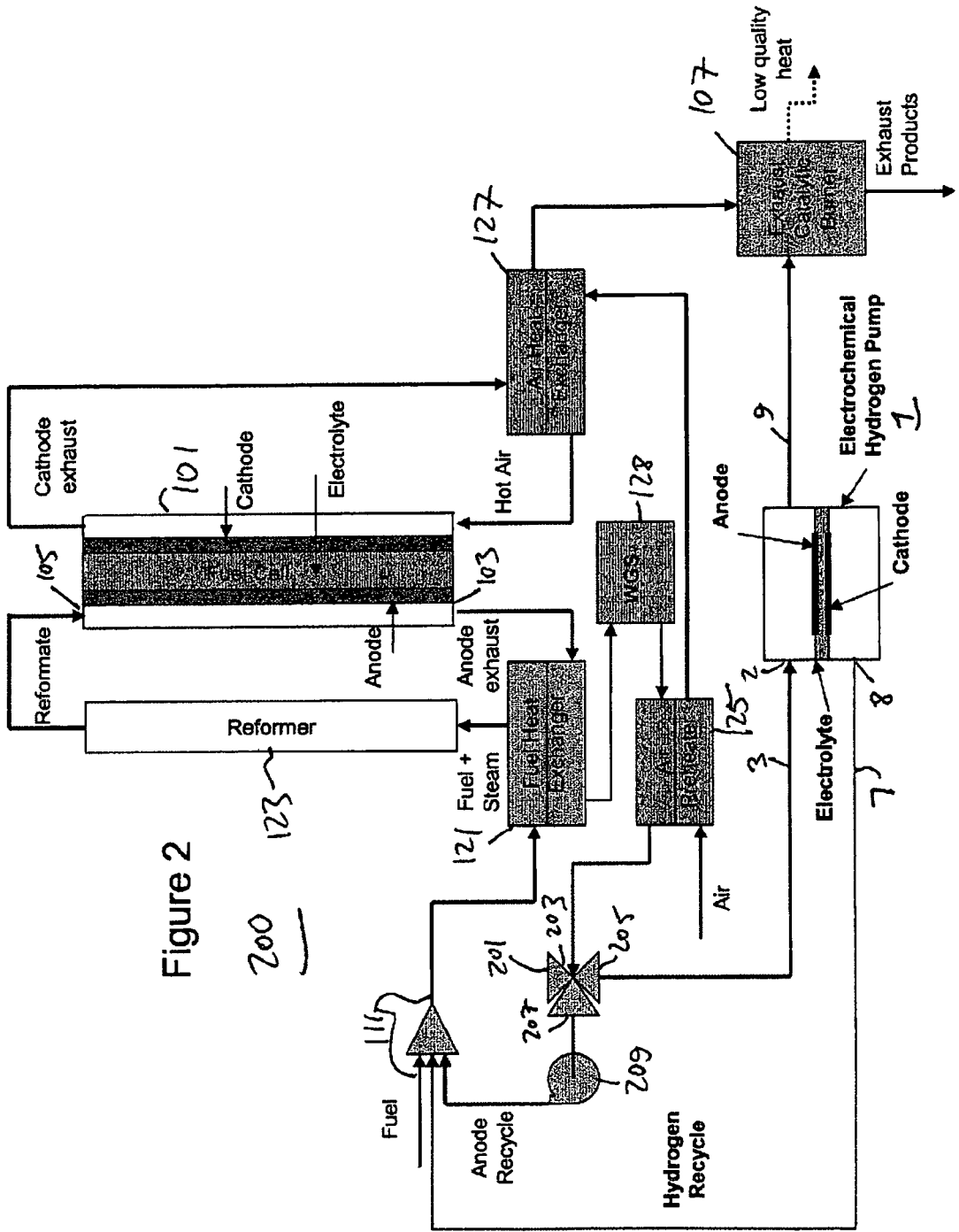

FIG. 2 illustrates a system 200 according to the second embodiment of the invention. The system 200 is similar to system 100 and contains a number of components in common. Those components which are common to both systems 100 and 200 are numbered with the same numbers in FIGS. 1 and 2 and will not be described further.

One difference between systems 100 and 200 is that system 200 preferably, but not necessarily lacks, the humidifier 119. Instead, a portion of the water vapor containing stack fuel exhaust stream is directly recycled into the stack fuel inlet stream. The water vapor in the fuel exhaust stream is sufficient to humidify the fuel inlet stream.

The system 200 contains a fuel splitter device 201, such as a computer or operator controlled multi-way valve, for example a three-way valve, or another fluid splitting device. The device 201 contains an inlet 203 operatively connected to the fuel cell stack fuel exhaust outlet 103, a first outlet 205 operatively connected to the unit 1 and a second outlet 207 operatively connected to the fuel cell stack fuel inlet 105. For example, the second outlet 207 may be operatively connected to the fuel inlet conduit 111, which is operatively connected to inlet 105. However, the second outlet 207 may provide a portion of the fuel exhaust stream into the fuel inlet stream further downstream.

Preferably, the system 200 contains a blower or compressor 209 which provides the fuel exhaust stream into the fuel inlet stream. Specifically, the outlet 207 of the valve 201 is operatively connected to an inlet of a blower or compressor 209, while an outlet of the blower or compressor 209 is connected to the hydrocarbon fuel inlet conduit 111. In operation, the blower or compressor 209 controllably provides a desired amount of the fuel cell stack fuel exhaust stream into the fuel cell stack fuel inlet stream.

The method of operating the system 200 is similar to the method of operating the system 100. One difference is that the fuel exhaust stream is separated into at least two streams by the device 201. The first fuel exhaust stream is recycled into the fuel inlet stream, while the second stream is directed into the separation unit 1 where at least a portion of hydrogen contained in the second fuel exhaust stream is electrochemically separated from the second fuel exhaust stream. The hydrogen separated from the second fuel exhaust stream is then provided into the fuel inlet stream. For example, between 50 and 70%, such as about 60% of the fuel exhaust stream may be provided to the blower or compressor 209, while the remainder may be provided toward the unit 1.

Preferably, the fuel exhaust stream is first provided through the heat exchangers 121 and 125 and reactor 128 before being provided into the valve 201. The fuel exhaust stream is cooled to 200 degrees Celsius or less, such as to 120 to 180 degrees, in the heat exchanger 125 prior to being provided into the valve 201 where it is separated into two streams. This allows the use of a low temperature blower 209 to controllably recycle a desired amount of the first fuel exhaust stream into the fuel inlet stream, since such blower may be adapted to move a gas stream which has a temperature of 200 degrees Celsius or less.

The blower or compressor 209 may be computer or operator controlled and may vary the amount of the fuel exhaust stream being provided into the fuel inlet stream depending on the conditions described below. If desired, all or a portion of the hydrogen separated from unit 1 may be provided to a hydrogen using device, such as a PEM fuel cell in a vehicle or another hydrogen using device or to a hydrogen storage vessel. In this case, a selector valve may be placed in conduit 7 to either split the hydrogen stream between the fuel inlet conduit 111 and the hydrogen storage vessel or hydrogen using device, or to alternate the hydrogen flow between the fuel inlet conduit 111 and the hydrogen storage vessel or hydrogen using device. The blower or compressor and the optional selector valve may be operated by a computer or an operator to controllably vary the gas flow based on one or more of the following conditions: i) detected or observed conditions of the system 100 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen from the fuel exhaust (i.e., tail) gas stream into the fuel inlet stream, a high efficiency operation of the fuel cell system is obtained. Furthermore, the overall fuel utilization is increased. The electrical efficiency (i.e., AC electrical efficiency) can range between about 50% and about 60%, such as between about 54% and about 60% for the methods of the first and second embodiments when the per pass fuel utilization rate is about 75% (i.e., about 75% of the fuel is utilized during each pass through the stack). An effective fuel utilization of about 94% to about 95% is obtained when the per pass utilization is about 75%, and about 85% of the fuel exhaust gas hydrogen is recycled back to the fuel cell stack by the separation unit 1. Even higher efficiency may be obtained by increasing the per pass fuel utilization rate above 75%, such as about 76-80%. At steady-state, the methods of the first and second embodiments eliminate the need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in net fuel utilization and the removal of heat requirement to generate steam increases the overall electrical efficiency. In contrast, without recycling hydrogen, the AC electrical efficiency is about 45% for a fuel utilization rate within the stack of about 75% to 80%.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a fuel inlet stream into a fuel cell stack, wherein the fuel cell stack is a solid oxide fuel cell stack;
operating the fuel cell stack to generate electricity and a hydrogen containing fuel exhaust stream;
lowering a temperature of a fuel exhaust stream to between 120° C. and 200° C. by exchanging heat with the fuel inlet stream and then with an air inlet stream;
passing the lower temperature fuel exhaust stream to a splitter;
passing a first portion of the lower temperature fuel exhaust stream to a high temperature, low hydration ion exchange membrane cell stack and a second portion of the lower temperature fuel exhaust stream into the fuel inlet stream;
separating at least a portion of hydrogen contained in the fuel exhaust stream using the high temperature, low hydration ion exchange membrane cell stack;
providing the hydrogen separated from the fuel exhaust stream into the fuel inlet stream; and
heating the air inlet stream, which is preheated by the fuel exhaust stream, using heat from an air exhaust stream;
wherein an AC electrical efficiency of the system is at least 50% and an effective fuel utilization is at least 94%.

2. The method of claim 1, wherein the high temperature, low hydration ion exchange membrane cell stack comprises a stack of acid doped non-fluorinated ion exchange ionomer membrane cells.

3. The method of claim 2, wherein each membrane of the membrane cells comprises a polybenzimidazole (PBI) membrane doped with sulfuric or phosphoric acid.

4. The method of claim 1, wherein the step of lowering a temperature of the fuel exhaust stream to between 120° C. and 200° C. comprises lowering a temperature of the fuel exhaust stream to between 160° C. and 190° C.

5. The method of claim 1, wherein the second portion of the lower temperature fuel exhaust stream is provided into the fuel inlet stream with a blower or compressor.

6. The method of claim 5, wherein the blower or compressor is controlled to vary an amount of the fuel exhaust stream being provided into the fuel inlet stream based on at least one condition.

7. The method of claim 6, wherein the at least one condition comprises a detected or observed condition of the system.

8. The method of claim 6, wherein the at least one condition comprises previous calculations or conditions which require a temporal adjustment of an amount of hydrogen in the fuel inlet stream.

9. The method of claim 6, wherein the at least one condition comprises a change in a price of electricity or hydrocarbon fuel compared to a price of hydrogen.

10. The method of claim 6, wherein the at least one condition comprises a change in electricity demand by users of electricity generated by the system.

* * * * *